United States Patent
Hansson et al.

(10) Patent No.: US 7,786,367 B2
(45) Date of Patent: Aug. 31, 2010

(54) MUSIC PLAYER CONNECTION SYSTEM FOR ENHANCED PLAYLIST SELECTION

(75) Inventors: Emil Hansson, Malmö (SE); Brian Johnson, Tokyo (JP); Mathias Jeppsson, Tokyo (JP)

(73) Assignee: Sony Ericsson Mobile Communications AB, Lund (SE)

( * ) Notice: Subject to any disclaimer, the term of this patent is extended or adjusted under 35 U.S.C. 154(b) by 101 days.

(21) Appl. No.: 12/190,672

(22) Filed: Aug. 13, 2008

(65) Prior Publication Data

US 2010/0037752 A1    Feb. 18, 2010

(51) Int. Cl.
*G10H 1/00* (2006.01)
(52) U.S. Cl. .......................... 84/600; 707/722
(58) Field of Classification Search ........... 84/600–602; 707/104.1, 722
See application file for complete search history.

(56) References Cited

U.S. PATENT DOCUMENTS

| | | | | |
|---|---|---|---|---|
| 5,428,732 | A * | 6/1995 | Hancock et al. .............. 715/201 |
| 7,325,043 | B1 * | 1/2008 | Rosenberg et al. .......... 709/219 |
| 2003/0063770 | A1 | 4/2003 | Svendsen et al. |
| 2003/0236695 | A1 * | 12/2003 | Litwin, Jr. .................... 705/10 |
| 2004/0039723 | A1 * | 2/2004 | Lee et al. ....................... 707/1 |
| 2005/0038819 | A1 * | 2/2005 | Hicken et al. ............. 707/104.1 |
| 2005/0117461 | A1 * | 6/2005 | Seo et al. ................. 369/30.08 |
| 2005/0165643 | A1 * | 7/2005 | Wilson et al. ................. 705/14 |
| 2005/0166233 | A1 * | 7/2005 | Beyda et al. .................. 725/46 |
| 2005/0251437 | A1 * | 11/2005 | Meuleman ................... 705/10 |
| 2005/0251807 | A1 * | 11/2005 | Weel .......................... 719/310 |
| 2006/0059260 | A1 * | 3/2006 | Kelly et al. ................. 709/225 |
| 2006/0100956 | A1 * | 5/2006 | Ryan et al. .................... 705/37 |
| 2006/0143236 | A1 * | 6/2006 | Wu .......................... 707/104.1 |
| 2006/0173974 | A1 * | 8/2006 | Tang .......................... 709/217 |
| 2006/0195516 | A1 * | 8/2006 | Beaupre .................... 709/203 |
| 2006/0217828 | A1 | 9/2006 | Hicken |
| 2006/0224260 | A1 | 10/2006 | Hicken et al. |
| 2006/0242661 | A1 * | 10/2006 | Bodlaender et al. ............ 725/9 |
| 2007/0078876 | A1 * | 4/2007 | Hayashi et al. ............. 707/101 |

(Continued)

FOREIGN PATENT DOCUMENTS

| WO | 01/53963 | 7/2001 |
|---|---|---|
| WO | 03/056825 | 7/2003 |
| WO | 2007/015183 | 2/2007 |

OTHER PUBLICATIONS

International Search Report and Written Opinion for corresponding application No. PCT/IB2009/000081 dated Jul. 13, 2009.

*Primary Examiner*—David S. Warren
(74) *Attorney, Agent, or Firm*—Renner, Otto, Boisselle & Sklar, LLP (57) ABSTRACT

A system compiles a music playlist to accommodate the tastes of various participants in a group setting. A music profile is created for each participant, the profile containing representations of songs that are characteristic of the participant's tastes. A master device may then compile a "super profile" that constitutes a compilation of the various participant profiles. Each participant device may then access the super profile and search among its specific song collection to find music that is similar to one or more songs represented in the super profile. From such songs, the master device may compile a playlist of songs that are similar among the participant devices, thereby representing the songs that correspond to the collective musical tastes of the participants. The playlist may be updated as participants enter and leave the group to track the changing collective tastes of the participants.

20 Claims, 9 Drawing Sheets

U.S. PATENT DOCUMENTS

| | | | |
|---|---|---|---|
| 2007/0244880 A1* | 10/2007 | Martin et al. | 707/5 |
| 2007/0282898 A1* | 12/2007 | Stark et al. | 707/103 R |
| 2008/0091717 A1* | 4/2008 | Garbow et al. | 707/104.1 |
| 2008/0104106 A1* | 5/2008 | Rosenberg et al. | 707/102 |
| 2008/0133529 A1* | 6/2008 | Berkowitz et al. | 707/8 |
| 2008/0182592 A1* | 7/2008 | Cha et al. | 455/456.3 |
| 2008/0195239 A1* | 8/2008 | Rotholtz et al. | 700/94 |
| 2008/0208379 A1* | 8/2008 | Weel | 700/94 |
| 2008/0208823 A1* | 8/2008 | Hicken | 707/3 |
| 2008/0209013 A1* | 8/2008 | Weel | 709/219 |
| 2008/0214145 A1* | 9/2008 | Howard et al. | 455/412.1 |
| 2008/0215173 A1* | 9/2008 | Hicken et al. | 700/94 |
| 2008/0215989 A1* | 9/2008 | Kravtsova et al. | 715/747 |
| 2008/0250328 A1* | 10/2008 | Konttinen | 715/747 |
| 2008/0301187 A1* | 12/2008 | Svendsen | 707/104.1 |
| 2009/0012635 A1* | 1/2009 | Hicken et al. | 700/94 |
| 2009/0049030 A1* | 2/2009 | Svendsen et al. | 707/5 |
| 2009/0049045 A1* | 2/2009 | Askey et al. | 707/7 |
| 2009/0063627 A1* | 3/2009 | Nowacek | 709/203 |
| 2009/0106787 A1* | 4/2009 | Maissel et al. | 725/9 |
| 2009/0210415 A1* | 8/2009 | Martin et al. | 707/5 |
| 2009/0222392 A1* | 9/2009 | Martin et al. | 706/46 |
| 2009/0228423 A1* | 9/2009 | Hicken et al. | 706/54 |
| 2009/0282102 A1* | 11/2009 | Geurts et al. | 709/204 |
| 2009/0298513 A1* | 12/2009 | Hampel et al. | 455/456.1 |
| 2009/0328087 A1* | 12/2009 | Higgins et al. | 725/10 |
| 2009/0328105 A1* | 12/2009 | Craner et al. | 725/46 |
| 2010/0070490 A1* | 3/2010 | Amidon et al. | 707/722 |

* cited by examiner

Music Characteristics Data 31

| Basic features | High-Level Features | Mood | Timeline Features |
|---|---|---|---|
| Tempo (BPM) | Vocal/Instrumental | Euphoric | Beat position |
| Speed | Male/Female | Joyful | Bar line |
| Dispersion | Newly recorded | Bright | Chord progression |
| Major | Electronic/Acoustic | Fresh | Music structure |
| Number of notes | Energy | Mild | Chorus part |
| Rhythm ratio | Ballad | Happy | Highlight |
| Three chord | Rap | Healing | Etc. |
| Clearness | Orchestra | Elegant | |
| Density | Piano | Solemn | |
| Amplitude range | Electric guitar | Sad | |

MUSIC PLAYER CONNECTION SYSTEM FOR ENHANCED PLAYLIST SELECTION

TECHNICAL FIELD OF THE INVENTION

The technology of the present disclosure relates generally to electronic devices, and more particularly to a system for connecting music players for an enhanced playlist selection of music in a group setting.

DESCRIPTION OF THE RELATED ART

Music is prevalent in various locations where people gather. It is often a challenge to select music that appeals to a highest proportion of those present. Managers of dance clubs, bars, and comparable entertainment venues may rely on music to attract patrons, and therefore desire, if not need, to select music playlists that appeal to the most patrons. Similar challenges relating to selecting enjoyable music may be prevalent for hosts of private parties, whether large or small. DJs who may be employed to supply the music for such important events as weddings, graduation parties, and other meaningful milestones also are faced with the problem of selecting widely enjoyable music for the event.

The selection of a playlist of enjoyable music is no small task, for individuals tend to have different musical tastes. As such, what constitutes enjoyable music for one crowd may be little more than noise for another. Even as to themed dance clubs or similar locations, what may constitute desirable music may change from day to day as the specific patrons differ. Indeed, collective musical tastes of a group may change even on a given day or occasion, as individual people come and go. Prior attempts to accommodate varying musical tastes have included such methods as taking requests, employing "shuffle" features to provide music variety, permitting patron access to juke boxes and comparable music selection systems, and the like. These methods, however, typically are not sufficient to accommodate a wide variety of musical tastes in an efficient manner. In addition, these methods conventionally require some form of input by a patron and/or host, and therefore may be inconvenient insofar as they tend to disrupt socializing.

Commonly, many individuals carry music players with them. Portable electronic devices, such as mobile telephones, media players, personal digital assistants (PDAs), and others, are ever increasing in popularity. To avoid having to carry multiple devices, portable electronic devices are now being configured to provide a wide variety of functions. For example, a mobile telephone may no longer be used simply to make and receive telephone calls. A mobile telephone may also be a camera (still and/or video), an Internet browser for accessing news and information, a messaging device (text, audio, and/or visual messages), a gaming device, a personal organizer, and have other functions as well. In particular, portable electronic devices often contain an audiovisual media player for playing a variety of media content, including music.

As the use of multi-media electronic devices, including portable electronic devices, has increased, attempts have been made to enhance the sharing and portability of media content. In particular, participants in the electronics and computing industries have formed the Digital Living Network Alliance (DLNA). Generally, the DNLA is an international, cross-industry collaboration that focuses on providing interoperable wired and wireless network technology for sharing and transmitting digital audiovisual content such as music, photos, videos, and the like. The DLNA provides a standards and certification program that certifies devices as DLNA compatible for sharing and transmitting media content in a manner that meets technical requirements while respecting intellectual property rights.

Despite its usefulness, however, DLNA-based technology has not been used efficiently with portable electronic devices to enhance music selection at dance clubs, bars, parties, and comparable public gatherings.

SUMMARY

To improve the consumer experience with portable electronic devices, there is a need in the art for an improved system and method for sharing music files and compiling music playlists to create a unique musical experience that accommodates the tastes of various participants in a group setting. In the described exemplary system, a music profile is created for each of the participants, the profile containing representations of songs that are characteristic of the participant's tastes. A master device may then compile a "super profile" that constitutes a compilation of the various participant profiles.

Each participant device may then access the super profile and search among its specific song collection to find music that is similar to one or more songs represented in the super profile. The identities of the similar songs may then be transmitted back to the master device, which may then compile a playlist of songs that are common or similar among the participant devices, thereby representing songs that correspond most to the collective musical tastes of the participants. In addition, as participants come and go, profiles of participant devices may be added and deleted, and the super profile may be updated commensurately. In this manner, the playlist may be continuously updated to track the changing collective tastes of the participants.

Therefore, according to one aspect of the invention, a method of generating shared media content comprises generating a plurality of media content profiles for a corresponding plurality of participant devices, combining the plurality of media content profiles into a super profile, comparing media files in the plurality of participant devices to the super profile based on comparison criteria, and identifying at least one media file that satisfies the comparison criteria.

According to one embodiment of the method, each profile represents the entire library of media files, and the generating step for each of the plurality of media content profiles comprises creating a plurality of seeds for media files selected based on an algorithm that determines which files most overlap in characteristics, each seed being a representation of a corresponding media file accessible by a corresponding participant device, and combining the plurality of seeds into the media content profile for the corresponding participant device.

According to one embodiment of the method, the media files are music files, and each seed includes musical characteristics data and an acoustic identifier for the corresponding music file.

According to one embodiment of the method, the musical characteristics data is incorporated into the metadata of the corresponding music file.

According to one embodiment of the method, the super profile includes seeds contained in the combined plurality of media content profiles.

According to one embodiment of the method, the comparing step includes comparing the media files of the plurality of participant devices to the seeds in the super profile, the comparison criteria being a designated similarity between a compared media file and at least one seed in the super profile.

According to one embodiment of the method, the method further comprises for each participant device, compiling a list of the identified media files that satisfy the comparison criteria, and combining the lists for each of the plurality of participant devices into a master playlist.

According to one embodiment of the method, the method further comprises playing the at least one identified media file.

According to one embodiment of the method, the playing step comprises transmitting a playback command to a participant device having access to the media file to be played, and wherein the media file is played by the participant device.

According to one embodiment of the method, the media files are music files.

According to another aspect of the invention, a host device for a media content sharing system comprises an input interface and a controller. The controller is configured to receive a plurality of media content profiles for a plurality of corresponding participant devices, and to combine the plurality of media content profiles into a super profile, wherein media files in the plurality of participant devices are compared to the super profile based on comparison criteria. The controller is further configured to receive via the input interface an identification of at least one media file that satisfies the comparison criteria.

According to one embodiment of the host device, the controller is configured to receive the media content profiles by receiving seed data corresponding to media files in the participant devices, and generating a music profile for each of the participant devices.

According to one embodiment of the host device, each music profile includes a plurality of seeds, each seed being a representation of a corresponding media file accessible by a corresponding participant device.

According to one embodiment of the host device, the media files are music files, and each seed includes musical characteristics data and an acoustic identifier.

According to one embodiment of the host device, the super profile includes seeds contained in the plurality of media content profiles.

According to one embodiment of the host device, the host device further comprises an output interface, wherein the host device transmits the super profile to each participant device via the output interface.

According to one embodiment of the host device, the host device further comprises an output interface, wherein for an identified media file, the host device transmits a playback command over the output interface to cause a participant device having access to the identified media file to play the media file.

According to one embodiment of the host device, the controller is further configured to receive via the input interface, and from each participant device, a list of identifications of a plurality of media files that satisfy the comparison criteria, and to combine the lists into a master playlist.

According to one embodiment of the host device, the media files are music files.

According to another aspect of the invention, a participant device for a media content sharing system comprises a storage device containing a plurality of stored media files, an input interface for receiving a super profile containing media content profiles corresponding to a plurality of other participant devices, and a controller. The controller is configured to compare the stored media files to the super profile based on comparison criteria to identify at least stored one media file that satisfies the comparison criteria. The participant device further comprises an output interface, wherein the controller is further configured to transmit the identification of at least one identified media file to a host device.

According to one embodiment of the participant device, the super profile includes a plurality of seeds, each seed being a representation of a corresponding media file accessible by a corresponding participant device.

According to one embodiment of the participant device, the media files are music files, and each seed includes musical characteristics data and an acoustic identifier.

According to one embodiment of the participant device, the musical characteristics data is incorporated into the metadata of the corresponding music file.

According to one embodiment of the participant device, the controller is configured to compare the stored media files to the seeds in the super profile, the comparison criteria being a designated similarity between a compared media file and at least one seed in the super profile. The controller is further configured to generate a list of identifications of a plurality of media files that satisfy the comparison criteria and to transmit the list to the host device.

According to one embodiment of the participant device, the participant device receives a playback command via the input interface corresponding to an identified media file, and the controller is further configured to stream the media file via the output interface to an output system for playback.

According to one embodiment of the participant device, the media files are music files.

According to one embodiment of the participant device, the participant device is a mobile telephone.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

The following describes a system and methods for sharing music files and compiling music playlists to create a unique musical experience that accommodates the tastes of various participants in a group setting. The system includes creating a music profile for each of the participants that contains representations of songs that are characteristic of the participant's tastes. When the participants arrive at an event location, participant devices automatically connect to a host or master device. For example, the participant and host devices may be DLNA-compatible devices that are set to a sharing mode. The master device may then compile a "super profile" that constitutes a compilation of the various participant profiles.

Each participant device may then access the super profile and search among its specific song collection to find music having characteristics similar to one or more songs represented in the super profile. The identities of the similar songs are then transmitted back to the master device. The master device may then compile a playlist of songs that are most common or similar among the participant devices, thereby representing the songs that correspond to the collective musical tastes of the participants. In one embodiment, the master device need not store the actual song files of the playlist for playback. Rather, the master device may send a "playback command" signal to a participant device that contains a stored music file for the song. The participant device may then stream the song or otherwise access a playback system to play the song.

In addition, as participants come and go, profiles of the participant devices may be added and deleted, and the super profile may be updated commensurately. In this manner, the playlist may be continuously updated to track the changing collective tastes of the participants.

This disclosure focuses on generating a playlist of music. It will be appreciated, however, that the disclosed system and methods may be applied to any media content, including, for example, other forms of audio besides music, still images, video or moving images, etc., and any combinations thereof.

Embodiments of the present invention will now be described with reference to the drawings, wherein like reference numerals are used to refer to like elements throughout. It will be understood that the figures are not necessarily to scale.

System Overview

Figure 1:
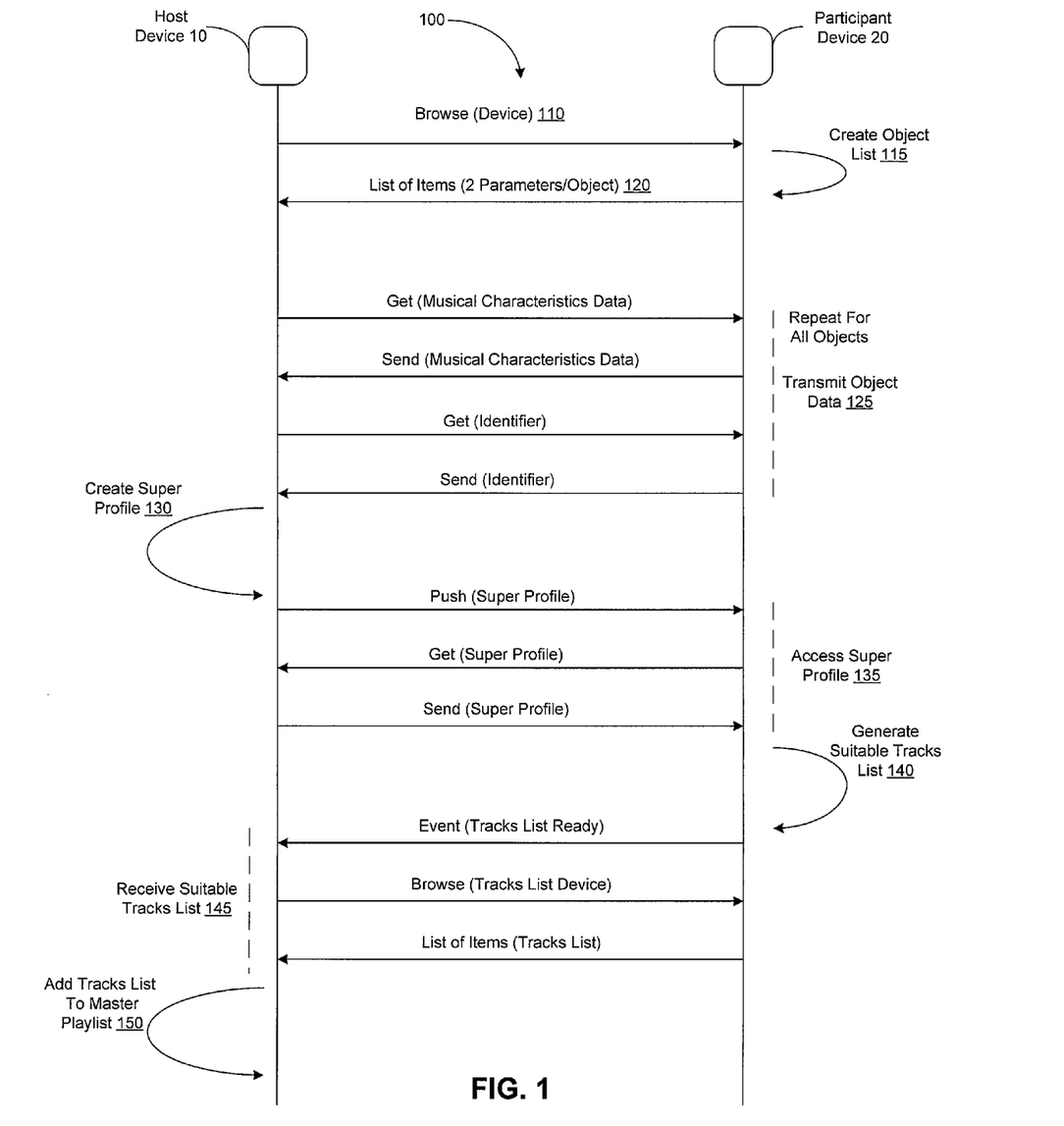
FIG. 1 is a graphical representation depicting an overview of an exemplary system and method of compiling a music playlist for a group of participants.

FIG. 1 is a graphical representation depicting an overview of an exemplary system and method of compiling a music playlist for a group of participants in a group setting. Although the exemplary system and method is described as a specific order of executing functional logic steps, the order of executing the steps may be changed relative to the order described. Also, two or more steps described in succession may be executed concurrently or with partial concurrence. It is understood that all such variations are within the scope of the present invention. It will be appreciated that FIG. 1 represents an overview, and more specific details regarding each aspect of the system are provided below.

FIG. 1 depicts a system 100 that includes the interactions between a host or master device 10 and at least one participant device 20. For example, the host or master device 10 may be a network server that supports the music sharing and connection features of the described system. The participant device 20 may be a portable electronic device having media player functionality, such as a mobile telephone with music playback capabilities. It will be appreciated that the system may include a plurality of participant devices that would interact similarly with the master device. In addition, the system may include a plurality of master devices that comprise a network of servers for performing the host functions described below. For simplicity, only one master device and one participant device are shown in the example of FIG. 1. The host or master device may automatically connect with the participant device, preferably over a wireless connection, although wired connections may be employed as well. In one embodiment, the host device and participant device are DLNA-certified devices that connect over a DLNA compatible network. As is known in the art, a DLNA network may employ a variety of network connection technologies, including, for example, Universal Plug and Play, IEEE 802.11 based Wi-Fi technologies, Bluetooth, and others.

Initially, at step 110 the host device 10 may execute a browse command or otherwise search the participant device 20 for a library of available or representative digital files or "objects", such as music files. At step 115, in response to the browse command or search, the participant device may generate a list of object files that meet the criteria of the browse function of the host device, which in this example would be a list of available music files. At step 120, the list of objects may be transmitted back to the host device 10 from the participant device 20.

In one embodiment, as seen in the example of FIG. 1, each object (music file) may be represented by two parameters: (1) musical characteristics data, and (2) an acoustic identifier. As further described below, the music characteristics data may be incorporated into the metadata of the digital music files. In addition, the identifier may be a short portion of the corresponding music track that acts as an acoustic footprint of the song. Thus, at step 125 object data including the musical characteristics data and the identifier may be transmitted from the participant device 20 to the host or master device 10. As shown in the example of FIG. 1, the object data may be acquired by the host device from the participant device through a series of Get/Send type commands or comparable directed toward the musical characteristics data and the identifier. In this manner, the host device may acquire the object data for a given number of song files stored in the participant device. As further described below, the group of songs for which object data is acquired by the host device is intended to reflect the musical tastes of the participant. The object data for a plurality of music files thus constitutes a music profile for the user of the corresponding participant device. These steps may then be repeated as to numerous participant devices to generate music profiles for a plurality of participants.

At step 130, the host device 10 may combine the music profiles of the various participant devices into a "super profile" for numerous participants. At step 135, the participant device may access the super profile. In the example of FIG. 1, a combination of "push", "get", and "send" commands is utilized to transmit the super profile from the host device to a participant device, although the precise command structure may be varied.

Once a participant device 20 has acquired or accessed the super profile, at step 140 the participant device may generate a list of suitable music tracks based on the super profile. For example, as further described below, the participant device may compare stored music files to the object data contained in the super profile to match music having similar parameters (musical characteristics and identifier) to one or more of the music tracks represented in the super profile. At step 140, the participant device may compile such identified similar songs into a list of suitable music tracks. At step 145, the tracks list may be received by the host device 10. In the example of FIG. 1, a combination of "event", "browse", and "list" commands is utilized to transmit the suitable tracks list from the participant device to the host device, although the precise command structure may be varied. At step 150, the suitable tracks list for this given participant device may be added to a master playlist including the identifications of suitable tracks similarly acquired from various other participant devices. The master playlist, therefore, ultimately is drawn from the music profiles of the various participants, thereby reflecting the collective musical tastes of the participants.

Figure 2:
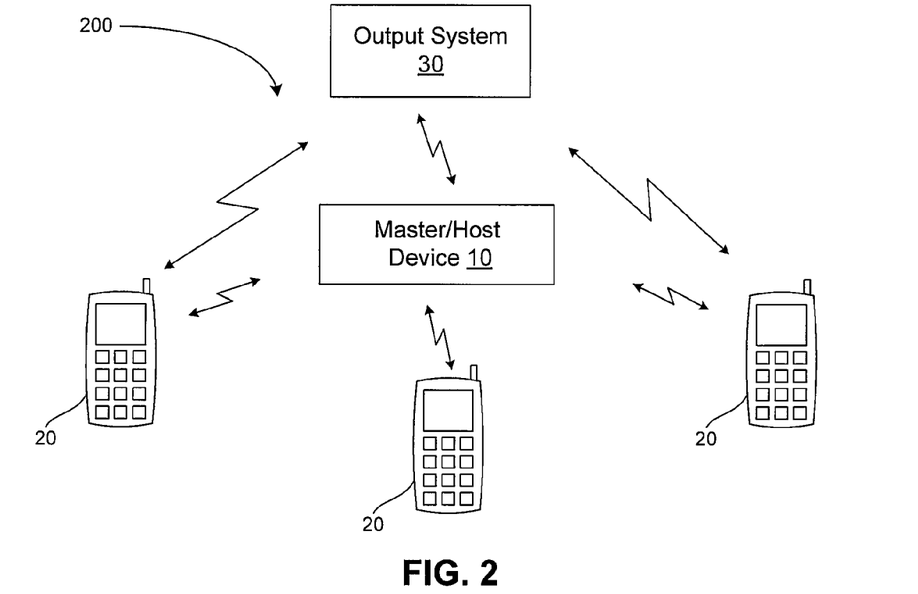
FIG. 2 is a schematic diagram of exemplary components for a music connection system.

Additional details regarding the specific aspects of the system will now be described with reference to the additional figures. FIG. 2 is a schematic diagram of an exemplary music connection system 200 including a host or master device 10 in wireless communication with three participant devices 20. The host device 10 also is in wireless communication with an output device 30. Each of the participant devices 20 may also be in wireless communication with the output system 30. As stated above, the system may include any number of host devices and/or participant devices. In addition, the interfaces need not all be wireless. In one embodiment, the components may be all DLNA certified devices that utilize any connection technology applicable to such devices.

The output device 30 may be an audiovisual system for playing audiovisual content such as one might find in a dance club, bar, party event, and the like. In the context of this disclosure, the output system 30 is described as a system for playing music, although the system may include components for playing other media content such as non-music audio, still images, moving or video images, etc., and combinations thereof. Accordingly, the output system 30 may include any number of receivers, mixers, speakers, display monitors, and other components conventionally used for playing audiovisual content. In addition, although FIG. 2 depicts the host device 10 and output system 30 as being separate devices, the host device may be integral with the output system or portions thereof.

In FIG. 2, the participant devices 20 are depicted as being conventional mobile telephones. It will be appreciated that the invention is not intended to be limited to the context of a mobile telephone and may relate to any type of appropriate electronic device containing media player functionality, examples of which include a gaming device, other portable radio communication equipment, or a desktop or laptop computer. The term "portable radio communication equipment," includes all equipment such as mobile telephones, pagers, communicators, electronic organizers, personal digital assistants (PDAs), smartphones, and any communication apparatus or the like.

Figure 3:
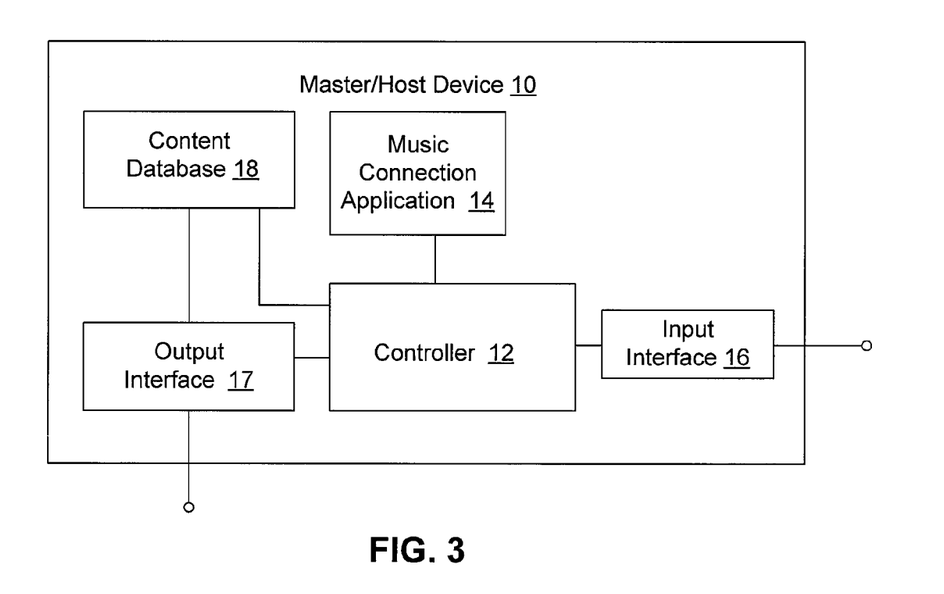
FIG. 3 is a schematic block diagram of operative portions of an exemplary host or master device.

FIG. 3 is a schematic block diagram of operative portions of an exemplary master or host device 10. The host device 10 may include a controller 12 that is configured to carry out overall control of the functions and operations of the host device 10. The controller may include a processing device, such as a CPU, microcontroller or microprocessor. Among its functions, to implement the features of the present invention, the controller may execute program code embodied as the music connection application 14 for carrying out the host device functions of the present invention. It will be apparent to a person having ordinary skill in the art of computer programming, and specifically in application programming for multimedia electronic devices, how to program the host device to operate and carry out logical functions associated with application 14. Accordingly, details as to specific programming code have been left out for the sake of brevity. Also, while the code may be executed by a controller circuit in accordance with an exemplary embodiment, such controller functionality could also be carried out via dedicated hardware, firmware, software, or combinations thereof, without departing from the scope of the invention.

Host device 10 may also include an input interface 16 and an output interface 17 for communicating with participant devices 20 and the output system 30. The input and output interfaces may communicate via any variety of wired or wireless connections, which may include DLNA compatible connection technologies as described above. In addition, although the input and out interfaces are depicted in FIG. 3 as separate components, they may be integrated into a single component or spread over multiple components.

Host device 10 may also include a content database 18 for storing content associated with the present invention. For example, as further described below, the content database 18 may store music files, playlists, participant profiles and combined super profiles, musical characteristics data and acoustic identifiers, and other related data.

Figure 4:
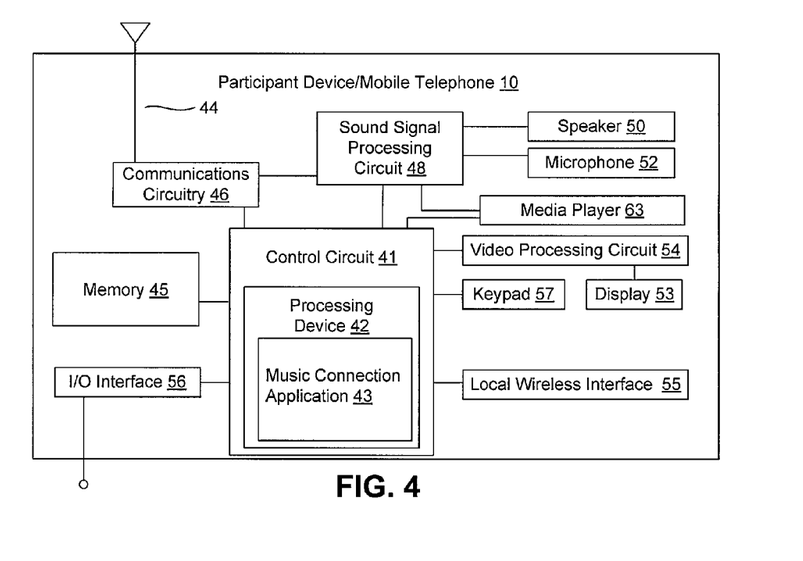
FIG. 4 is a schematic block diagram of operative portions of a mobile telephone for use as an exemplary participant device.

FIG. 4 is a schematic block diagram of operative portions of an exemplary participant device 20 embodied as an exemplary mobile telephone. As stated above, the participant device need not be a mobile telephone, but may be any suitable electronic device. Mobile telephone 20 may include a primary control circuit 41 that is configured to carry out overall control of the functions and operations of the mobile telephone 20. The control circuit 41 may include a processing device 42, such as a CPU, microcontroller or microprocessor. Among their functions, to implement the features of the present invention, the control circuit 41 and/or processing device 42 may comprise a controller that may execute program code embodied as the music connection application 43 for carrying out the participant device functions of the present invention. It will be apparent to a person having ordinary skill in the art of computer programming, and specifically in application programming mobile telephones or similar electronic devices, how to program a mobile telephone to operate and carry out logical functions associated with application 43. Accordingly, details as to specific programming code have been left out for the sake of brevity. Also, while the code may be executed by control circuit 41 in accordance with an exemplary embodiment, such controller functionality could also be carried out via dedicated hardware, firmware, software, or combinations thereof, without departing from the scope of the invention.

The mobile telephone 20 includes communications circuitry 46 that enables the mobile telephone 20 to establish a call and/or exchange signals with a called/calling device. The mobile telephone 20 also may be configured to transmit, receive, and/or process data such as text messages (e.g., colloquially referred to by some as "an SMS," which stands for short message service), electronic mail messages, multimedia messages (e.g., colloquially referred to by some as "an MMS," which stands for multimedia message service), image files, video files, audio files, ring tones, streaming audio, streaming video, data feeds, and so forth. Processing such data may include storing the data in a memory 45, executing applications to allow user interaction with data, displaying video and/or image content associated with the data, outputting audio sounds associated with the data and so forth. The mobile telephone 20 may include an antenna 44 coupled to the communications circuit 46 as is conventional.

In the context of the present disclosure, the communications circuit 46 and antenna 44 may be used to wirelessly communicate with the host device 10 and output system 30. The mobile telephone 20 also may include an I/O interface 56 that permits wired connections to a variety of conventional I/O devices. The mobile telephone 20, therefore, may additionally or alternatively connect to the host device 10 with a wired connection via the I/O interface 56.

The described components may be combined to provide a music connection system for playing music that accommodates the collective tastes of participants in a group setting. The participants may be attendees or patrons of a dance club, bar, party, event, or comparable gathering. As an overview, the system may perform the following functions: (1) profiling the musical tastes of each of the participants, (2) combining the individual profiles into a "super profile" to reflect the combined musical tastes of the participants, and (3) generating a playlist from the super profile and playing back songs from the playlist.

Generating the Music Profiles

When a participant device 20 enters an event or location employing the described system, automatic communication may be established between the host device and the participant device. The automatic communication may be established by the execution of host application 14 and participant application 43 identified above. A music profile then may be generated for each participant device.

Referring again to FIG. 1, the host device 10 may browse the participant device to generate an "object list" of music files. Object data may be generated to represent each corresponding music file. As stated above, the music files may be represented by two data parameters: (1) musical characteristics data, and (2) an acoustic identifier. By employing these parameters, the host device may analyze samples of music files stored in a participant device without having to manipulate entire music files. System resources thus may be conserved and allocated more efficiently. As used herein, the combined musical characteristics data and identifier corresponding to a music file is referred to as a "seed". The host device may compile one or more seeds into a music profile for the corresponding participant device to reflect the participant's musical tastes.

Figure 5:
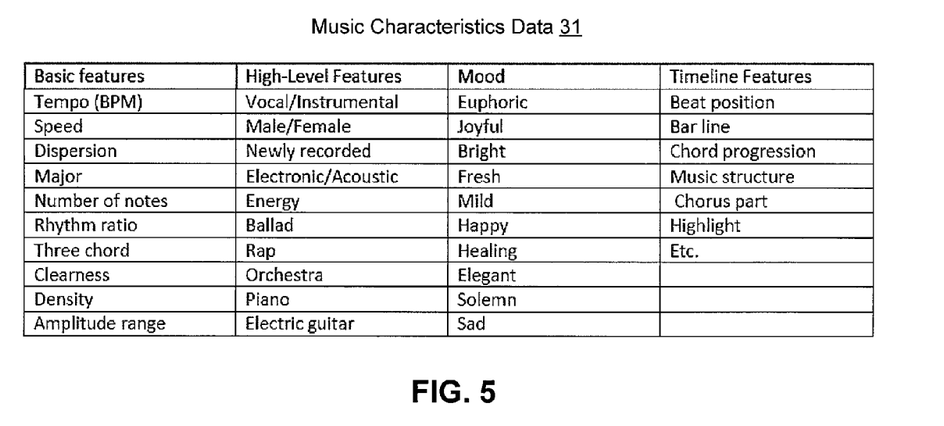
FIG. 5 depicts an exemplary representation of musical characteristics data.

A given seed for a corresponding music file, therefore, may include musical characteristics data and an acoustic identifier. FIG. 5 depicts an exemplary representation of musical characteristics data fields 31. The data includes various characteristics that comprise a tone analysis of a given music file. In FIG. 5, the fields are left blank and depict the general features of the musical characteristics data. It will be appreciated that for a given music file, entry data may be entered for each of the depicted fields. The fields, therefore, may be considered a collective tone analysis of the music file based on various basic features, high-level features, mood, and timeline features as identified in FIG. 5. It will be appreciated that the precise fields depicted in FIG. 5 are exemplary and may be varied. In one embodiment, the musical characteristics data 31 may be incorporated into the metadata of the music file.

A seed may also include an acoustic identifier 32, which is a short portion of the actual musical track that may be sampled by the host device 10. The music portion may be converted into a graphical representation of the music portion having frequency and/or amplitude characteristics. The graphical representation may be considered an "acoustic footprint" that may provide a basis for a comparison to another portion of music.

Figure 6:
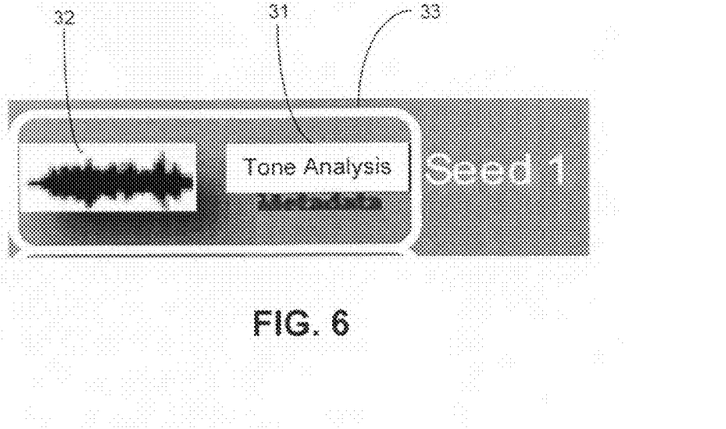
FIG. 6 is a schematic diagram of an exemplary seed having musical characteristics data and an acoustic identifier for a particular music file.
Figure 7:
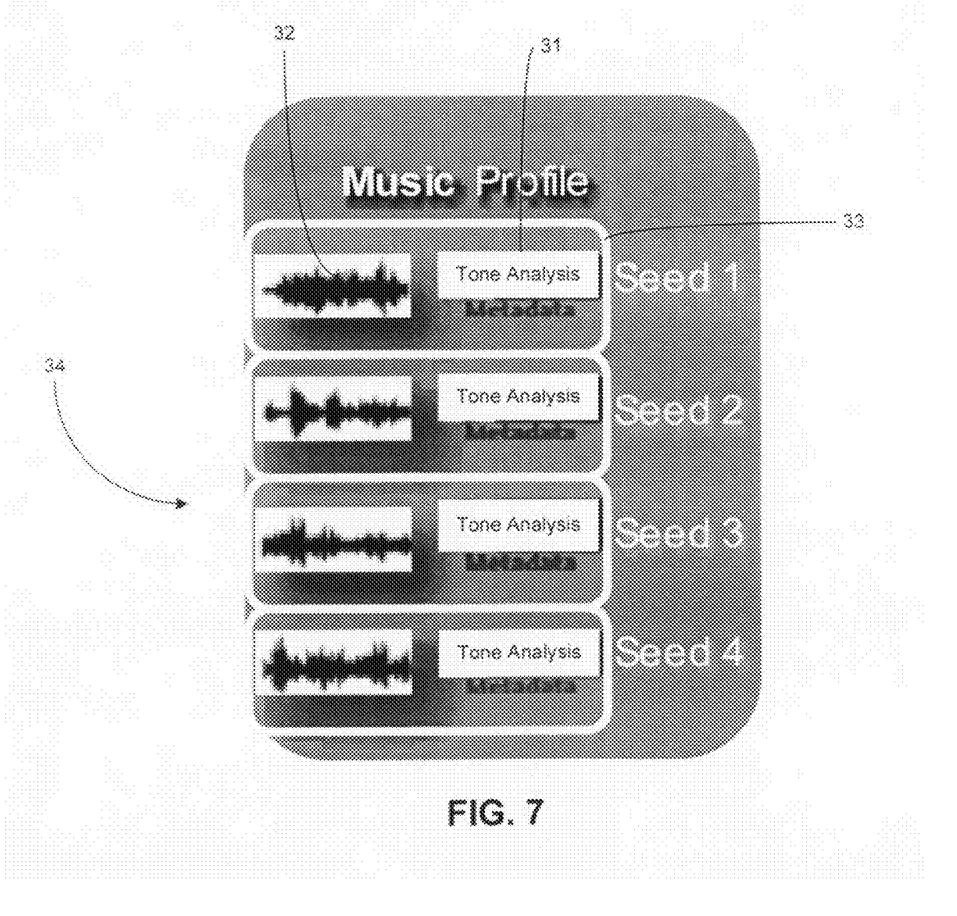
FIG. 7 is a schematic diagram depicting an exemplary music profile for a participant device.

FIG. 6 depicts an exemplary seed 33 for a particular music file, including the music characteristics data 31 and the acoustic identifier 32. This seed, therefore, provides a short-form representation of a music file that may be resident in a participant device. As depicted in FIG. 7, a plurality of seeds 33 may be combined into a music profile 34 for a participant device. In the example of FIG. 7, the music profile includes four seeds, although the precise number of seeds in the music profile may be varied. By assembling a music profile from seeds rather than from the underlying music files, computing memory and resources may be conserved. For example, the four-seed profile depicted in a FIG. 7 may have a file size of approximately 20 KB, far smaller than a typical music file. The profile may be stored in an xml-styled or comparable format for convenient manipulation.

Figure 8:
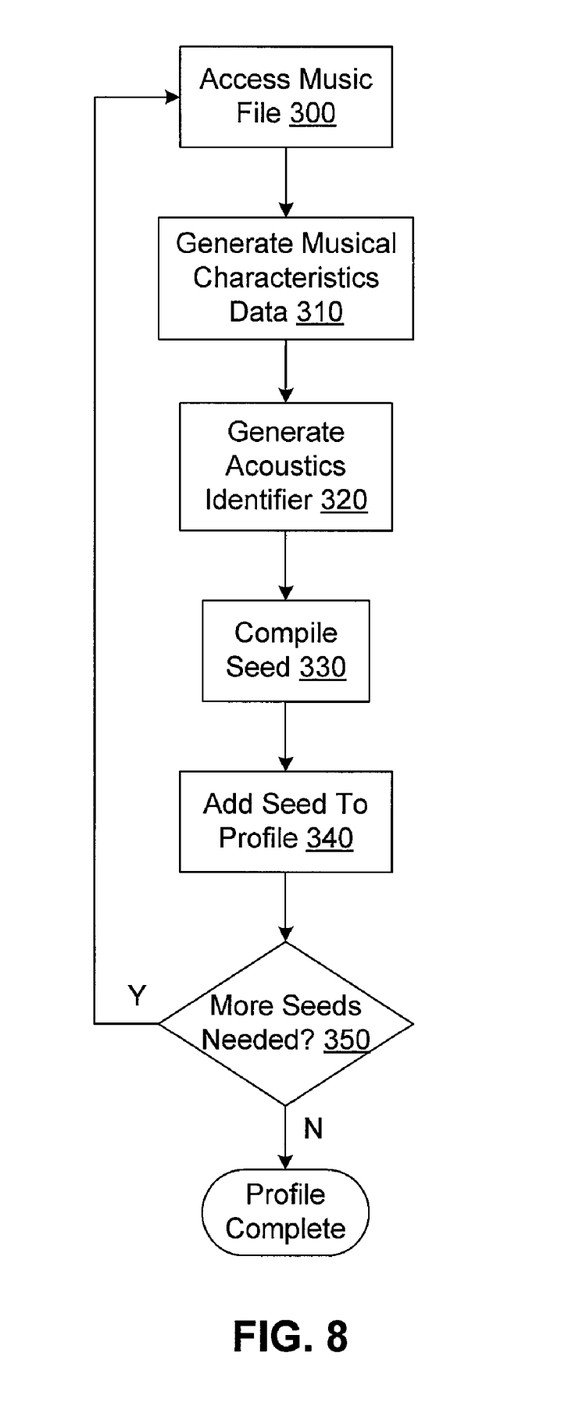
FIG. 8 is a flow chart depicting an exemplary method of generating a music profile for a participant device.

Based on the above, FIG. 8 is a flow chart depicting an exemplary method of generating a music profile for a participant device 20. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

At step 300, a music file is accessed. At steps 310 and 320, the musical characteristics data and acoustic identifier are generated, respectively. At step 330, a seed is compiled for the music file by combining the musical characteristics data and the acoustic identifier. At step 340, the seed is added to the music profile. At step 350, a determination is made as to whether the music profile requires additional seeds. If so, another music file is accessed, and if not, the profile is complete and the method ends.

The music profile may be generated in a manner that represents a participant's musical tastes. For example, in the four-seed profile of FIG. 7, two seeds may correspond to the most played songs over the life of the participant device, and two seeds may correspond to songs that the user has listened to most recently. By deriving the profile from seeds of songs that have been played most often and most recently, the participant's musical tastes may be estimated. Other schemes may be employed to estimate a participant's musical tastes. For example, the profile may be derived from seeds of songs based on an algorithm that determines which songs have the most overlap in characteristics. In addition, the seeds, and in turn the profile, may be updated as the music listening behavior of the participant changes over time.

The profile may be created in a variety of ways. For example, the host device 10 may create the profile by receiving seed data for a participant's music files and generating the profile by executing application 14. Alternatively, the participant device 20 may create the profile internally by executing application 43, and the profile itself may then be transmitted to the host device. The task of generating the profile also may be shared by the host and participant devices. For example, the participant device may generate seeds for various music files, and the host device may select a subset of the seeds to be included in the profile to estimate the participant's music tastes. Other methods of generating the music profile may be employed.

Generating the Super Profile

As stated above, when a participant arrives at a dance club, party, or comparable event, the participant device 20 may be automatically connected to the music connection system 100, 200 (see FIGS. 1 and 2). For example, the connection may be initiated by the host device 10 continuously searching its range for additional participant devices 20, or the connection may be initiated by a participant device sending out a registration signal to the host device. The network may be a DLNA-based network to facilitate the ability of the devices to connect. A profile for each participant device may then be generated and/or accessed in the manner described above. As more participants enter the network, more profiles are present that can be combined to generate a playlist of music files to accommodate the collective musical tastes of the participants.

Figure 9:
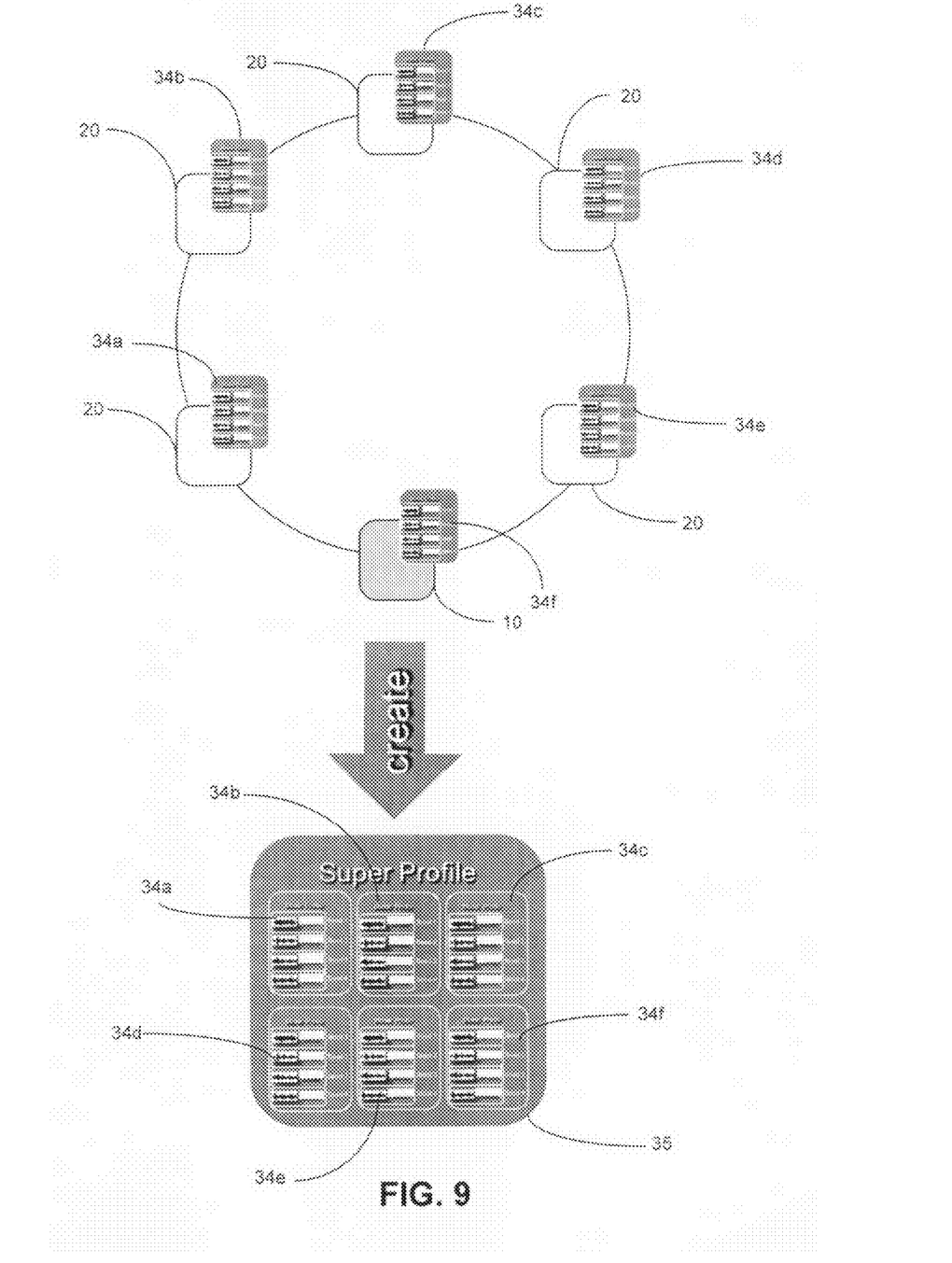
FIG. 9 is a graphical representation depicting an exemplary generation of a super profile for plurality of participant devices.

The host device first may generate a "super profile" by combining the profiles of the individual participant devices. FIG. 9 is a graphical representation depicting an exemplary generation of a super profile 35 for a plurality of participant devices. In the example of FIG. 9, the system includes a host device 10 (designated by the shading) and five participant devices 20, although the precise number of devices may be varied. Each participant device has its own profile 34a-e that may be generated as described above. In this example, the host device 10 also has a profile 33f, and thus may also act as a participant device. The host device may access the profiles of the various participant devices over the network, and combine them (along with its own profile) into a super profile 35 that includes all of the individual profiles. Once the super file has been created, the super profile may be distributed to the participant devices to provide a basis for selecting a playlist of songs.

Figure 10:
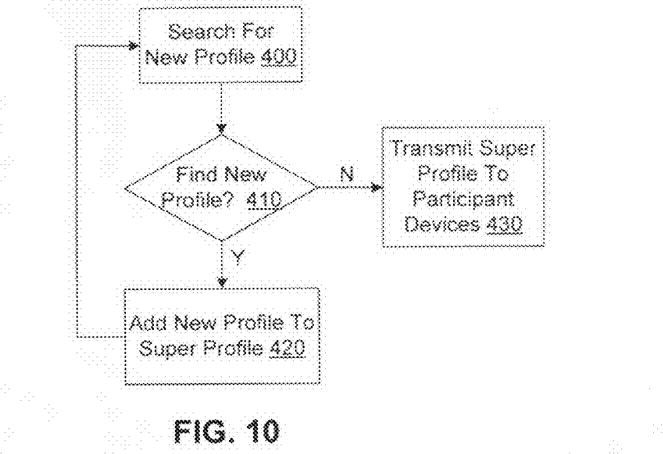
FIG. 10 is a flow chart depicting an exemplary method of generating a music super profile by a master device for a plurality of participant devices.

FIG. 10 is a flow chart depicting an exemplary method of generating a music super profile by the host device 10 for a plurality of participant devices 20. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

At step 400, the host device may search the network for a new profile of a participant device. At step 410, a determination may be made as to whether a new profile is found. If so, at step 420 the new profile may be added to the super profile. The method may return to step 400, wherein the host device may search for additional new profiles. When no new profiles are detected by the host device at step 410, the formation of the super profile is complete. At step 430, the super profile may be transmitted to the participant devices.

The super profile may be continuously updated. As participant devices join or leave the network, profiles may be commensurately added or deleted from the super profile respectively. The updated super profile may then be transmitted to the various participant devices that remain or are now present. In this manner, changing collective musical tastes of the group may be accommodated insofar as the updated super profile adjusts to reflect the musical tastes of new and/or removed participants.

Generating a Playlist and Music Playback

Figure 11:
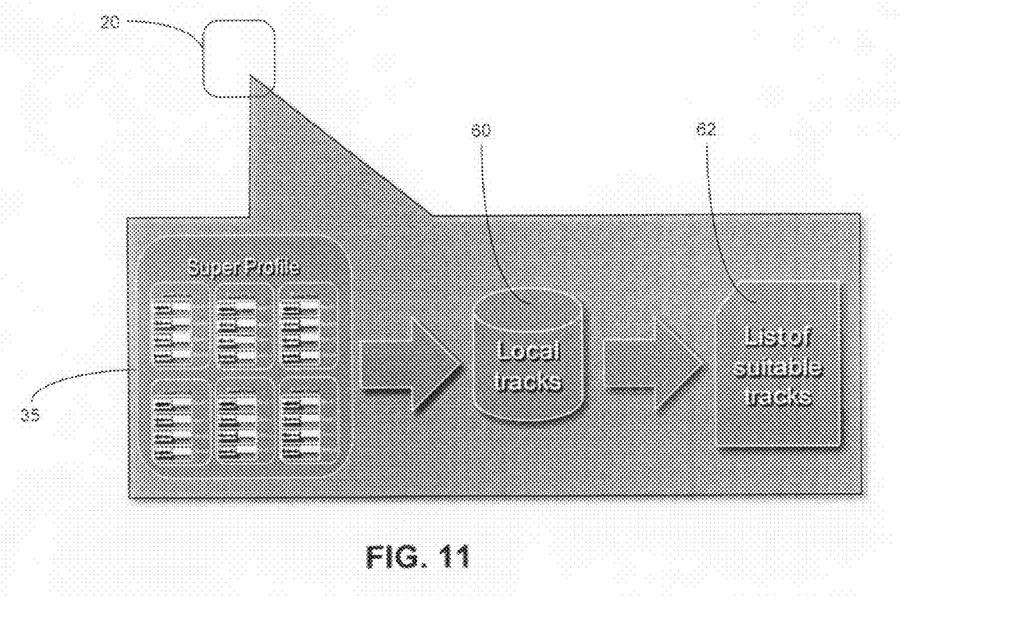
FIG. 11 is a graphical representation depicting an exemplary selection of suitable tracks by a participant device.

After the super profile has been transmitted to the participant devices, each participant device may execute a search routine to compare the super profile to a library of songs or music tracks stored in the participant device. The search routine may be executed by the application 43 in each participant device 20. FIG. 11 is a graphical representation depicting an exemplary selection of suitable tracks or songs by a participant device 20. In particular, the participant device 20 may compare the super profile 35 to a database or library 60 of stored local music tracks to identify music tracks or files that satisfy comparison criteria. The local music tracks (music files) may be stored in the memory 45 of the participant device. Based on the satisfaction of the comparison criteria, the participant device may identify suitable tracks 62 for a playlist, i.e., stored songs that have a designated similarity to the songs represented by the seeds stored in the super profile.

For example, as stated above, each seed of the super profile corresponds to a song file stored in one or more of the participant devices, which may be a different participant device from the device that is analyzing the super profile. Each seed contains the musical characteristics data derived from the metadata of the song file, and an acoustic identifier or footprint. A participant device may compare this seed data to comparable data in the stored song files to determine which stored songs are musically similar to one or more seeds. Note that the comparison need not seek exact matches. Rather, the comparison need only identify songs having a designated similarity on the basis that similar songs represent music of the same taste or character as that of the seeds. For example, a song may be deemed similar to a seed if there is a predetermined proportion of match between the seed data and comparable data relating to a stored song file. In one embodiment, a seed may be created for each music file stored in a participant device, and the identification of suitable songs may be made by comparing the seeds of the stored music files to the seeds in the super profile. In other embodiment, the comparison may be made by storing the musical characteristics and acoustic identifiers in the metadata of the song files, and the metadata may be compared. Identifications of the suitable tracks may be compiled into the suitable tracks list 62. The list of suitable tracks may then be transmitted back to the host or master device 10.

Figure 12:
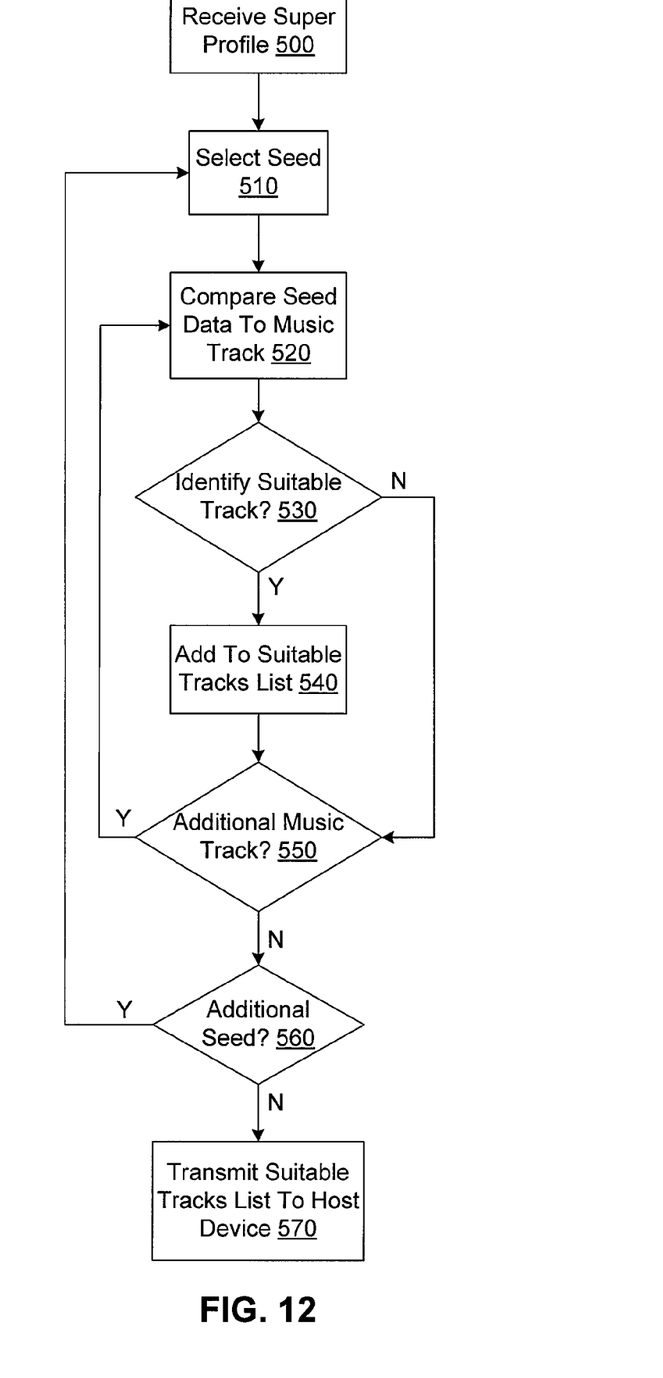
FIG. 12 is a flow chart depicting an exemplary method by which a participant device may generate a list of suitable tracks for a playlist.

FIG. 12 is a flow chart depicting an exemplary method by which a participant device may generate a list of suitable tracks for a playlist. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 500, at which a participant device may receive a transmission of the super profile from the host or master device. At step 510, a seed may be selected from the super profile. At step 520, the data within the seed (musical characteristics data and acoustic identifier) may be compared to comparable data within a musical track (song file). At step 530, a determination may be made as to whether there is a designated similarity between the seed and the musical track to identify the musical track as a suitable track to be added to a playlist. If the track is deemed suitable, at step 540 the track may be added to a list of suitable tracks for that participant device. As indicated at step 550, the comparison may be repeated for each music track stored in the participant device. Once applicable music tracks have been compared to the selected seed, at step 560 a determination may be made as to whether there is another seed within the super profile to analyze. In other words, all applicable seeds of the super profile may be compared to the applicable music files within the participant device to identify suitable tracks. Once all applicable seeds have been analyzed, at step 570 the list of suitable tracks for that participant device may be transmitted to the host or master device. Because the selection of suitable tracks is based on the super profile, the suitable tracks are consistent with the collective musical tastes of the numerous participants.

It will be appreciated that the above process may be performed by each participant device connected in the network. In this manner, the host or master device may acquire a list of suitable tracks from each participant device. As described in more detail below, the host device may then combine the various lists of suitable tracks into a master playlist that represents the collective musical tastes of the participants.

Figure 13:
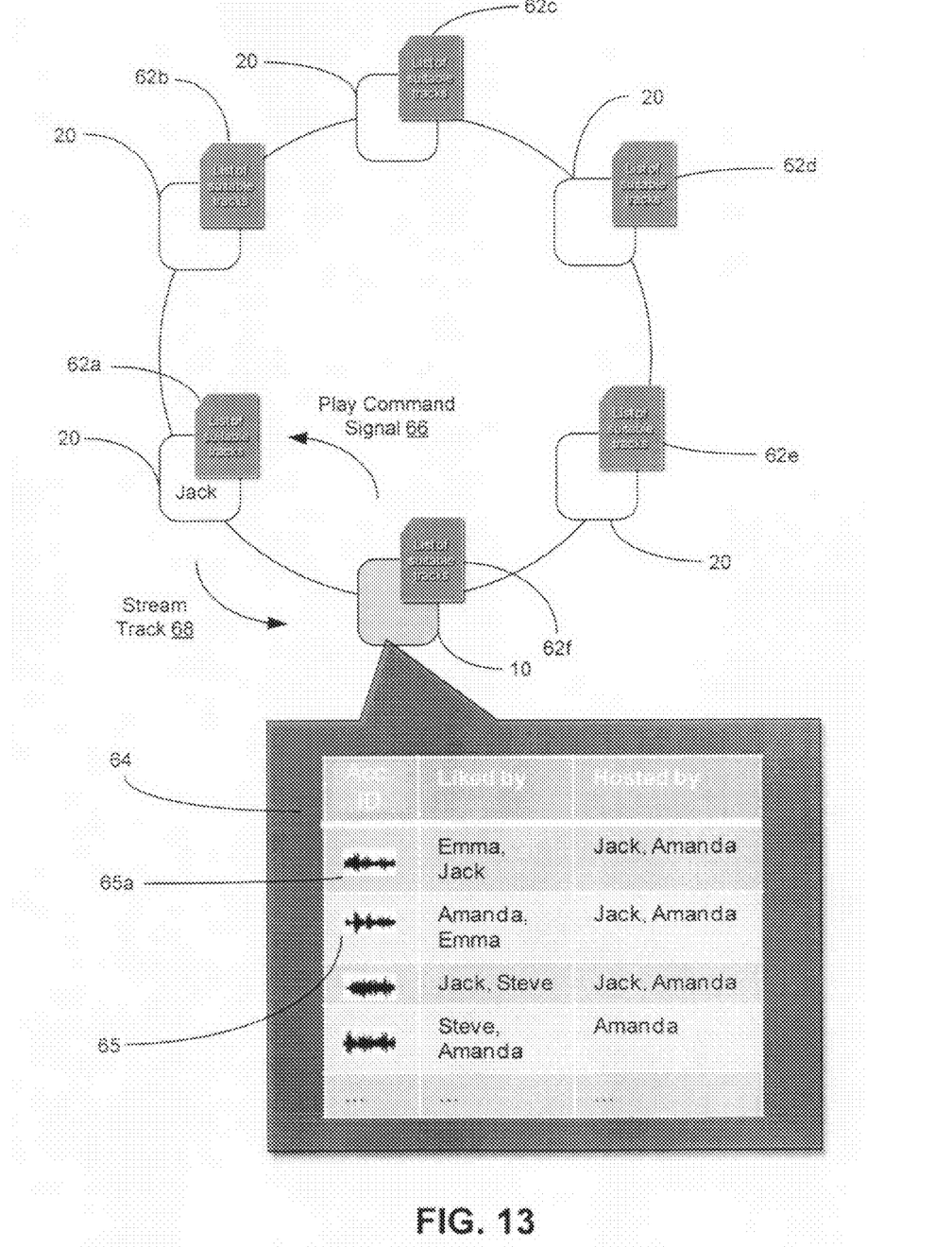
FIG. 13 is a graphical representation depicting an exemplary creation of a playlist and the playback of a particular song.

FIG. 13 is a graphical depiction of an exemplary creation of a master playlist and the playback of a particular song. As stated above, each participant device 20 may generate a list of suitable tracks 62. In the example of FIG. 13, there are five participant devices 20 that have generated suitable tracks lists 62a-e, although it will be appreciated that the precise number of participants may be varied. In addition, the host or master device 10 may also generate a list of suitable tracks 62f from its own internal database of stored music files. The host device 10 may then receive the lists of suitable tracks over the network, and combine them into a master playlist 64 of music tracks 65. FIG. 13 depicts the first four music tracks or songs in the master playlist, but the playlist may have any length depending on the number of participants and sizes of the individual lists of suitable tracks 62. In addition, as participant devices join or leave the network, the lists of suitable tracks 62 may change, and the host device 10 may alter the master playlist 64 commensurately by adding or deleting music tracks 65. In this manner, the master playlist may be adapted to the dynamic variations of the collective musical tastes of the participants.

As depicted in the example of FIG. 13, the identifications of songs in the master playlist 64 each may be represented by a set of parameters or fields. For example, each song in FIG. 13 is associated with its acoustic identifier, a "Like by" field, and a "Hosted by" field. The "Liked by" field may identify those participants who are likely to enjoy a particular song based on a participant's tastes as measured by the profile and list of suitable tracks generated for that participants' device. The "Host by" field may identify a participant (or participants) whose device actually contains the stored music track. It will be appreciated that the manner of identifying and/or representing songs in the playlist may be varied.

Playback of songs in the master playlist 64 may proceed as follows. Referring again to FIG. 13, for example, the first song 65a in the master playlist is indicated as being hosted by Jack and Amanda. In other words, the music file for this song is stored in each of the participant devices of Jack and Amanda. In this example, the host or master device 10 has designated Jack's device 20 for playing back song 65a. The host device 10 may transmit a playback command signal, as indicated by arrow 66, to Jack's participant device 20. In response, Jack's participant device may stream the music track, as indicated by arrow 68, back to the host device for playback on the output system 30 (see FIG. 2). Alternatively, Jack's participant device may stream the music track directly to the output system 30 as shown by the wireless connections in FIG. 2 between each participant device and the output system. In particular, if all the participating devices and output system devices are DLNA compatible device, links among the participant devices and output system may be readily achieved. In this embodiment, note that the actual music files need not be transmitted between the participant devices and host devices to generate the master playlist, thereby conserving system resources. Alternatively, however, the master playlist may comprise the actual music files, received from the participant devices and stored in the host device, which then may be played over the output system.

It will be appreciated, therefore, that the described system has several advantages over current systems for playing music in group settings. The system automatically generates a playlist of songs with minimal effort by either the attendees or a host person. Attendees and hosts, therefore, may spend more time socializing and less time deciding on what music to play. In addition, the playlist is derived from music files stored on the attendees' and hosts' electronic devices, increasing the likelihood that the music will represent the tastes of the group. Particularly if the system is based on DLNA technology, the system may be employed in a variety of settings and locations (indoor and outdoor), and accommodate various types of electronic devices. The system also readily updates the playlist as people may leave or arrive at the event or location. The system, therefore, may adjust to the changing tastes of the group.

Referring again to FIG. 4, additional features of the mobile telephone 20 as an exemplary participant device will now be described. For the sake of brevity, generally conventional features of the mobile telephone 20 will not be described in great detail herein.

Mobile telephone 20 has a display 53 that displays information to a user regarding the various features and operating state of the mobile telephone 20, and displays visual content received by the mobile telephone 20 and/or retrieved from the memory 45. The display 53 may be coupled to the control circuit 41 by a video processing circuit 54 that converts video data to a video signal used to drive the various displays. The video processing circuit 54 may include any appropriate buffers, decoders, video data processors and so forth. The video data may be generated by the control circuit 41, retrieved from a video file that is stored in the memory 45, derived from an incoming video data stream received by the communications circuit 46 or obtained by any other suitable method.

Mobile telephone 20 may include a keypad 57 for providing a variety of input functions. For example, keypad 57 typically includes alphanumeric keys for allowing entry of alphanumeric information such as telephone numbers, phone lists, contact information, notes, etc. In addition, keypad 57 typically includes special function keys such as a "send" key for initiating or answering a call, and others. Special function keys also may include keys for navigating and selecting items from a menu displayed on display 53. Some or all of the keys may be used in conjunction with the display as soft keys. Keys or key-like functionality also may be embodied as a touch screen associated with the display 53.

The mobile telephone 20 also may include a local wireless interface 55, such as an infrared transceiver and/or an RF adaptor (e.g., a Bluetooth adapter), for establishing communication with an accessory, another mobile radio terminal, a computer or another device.

The mobile telephone 20 also may include a media player 63. The media player 63 may be used to present audiovisual content to the user which may include images and/or sound together or individually, such as photographs or other still images, music, voice or other sound recordings, movies, mobile television content, news and information feeds, streaming audio and video, and the like. The mobile telephone 20 further includes a sound signal processing circuit 48 for processing audio signals transmitted by and received from the communications circuit 46 or associated with content played by the media player 63. Coupled to the sound processing circuit 48 are a speaker 50 and microphone 52 that enable a user to listen and speak via the mobile telephone 20 as is conventional.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of generating shared media content comprising:
  generating a plurality of media content profiles for a corresponding plurality of participant devices, wherein a media content profile includes a representation of at least one corresponding media file in the corresponding participant device;
  combining the plurality of media content profiles into a super profile;
  comparing media files in the plurality of participant devices to the super profile based on comparison criteria; and
  identifying at least one media file in a participant device that satisfies the comparison criteria.

2. The method of claim 1, wherein the generating step for each of the plurality of media content profiles comprises:
  creating a plurality of seeds, each seed being a representation of a corresponding media file accessible by a corresponding participant device; and
  combining the plurality of seeds into the media content profile for the corresponding participant device.

3. The method of claim 2, wherein the media files are music files, and each seed includes musical characteristics data and an acoustic identifier for the corresponding music file.

4. The method of claim 2, wherein the super profile includes seeds contained in the combined plurality of media content profiles.

5. The method of claim 4, wherein the comparing step includes comparing the media files of the plurality of participant devices to the seeds in the super profile, the comparison criteria being a designated similarity between a compared media file and at least one seed in the super profile.

6. The method of claim 1, further comprising:
  for each participant device, compiling a list of the identified media files that satisfy the comparison criteria; and
  combining the lists for each of the plurality of participant devices into a master playlist.

7. The method of claim 1, further comprising playing the at least one identified media file, wherein the playing step comprises transmitting a playback command to a participant device having access to the media file to be played, and wherein the media file is played by the participant device.

8. A host device for a media content sharing system comprising:
  an input interface; and
  a controller configured to receive a plurality of media content profiles for a plurality of corresponding participant devices wherein a media content profile includes a representation of at least one corresponding media file in the corresponding participant device, and to combine the plurality of media content profiles into a super profile, wherein media files in the plurality of participant devices are compared to the super profile based on comparison criteria; and
  the controller is further configured to receive via the input interface an identification of at least one media file in a participant device that satisfies the comparison criteria.

9. The host device of claim 8, wherein the controller is configured to receive the media content profiles by receiving seed data corresponding to media files in the participant devices, and generating a music profile for each of the participant devices.

10. The host device of claim 8, wherein each music profile includes a plurality of seeds, each seed being a representation of a corresponding media file accessible by a corresponding participant device.

11. The host device of claim 10, wherein the super profile includes seeds contained in the plurality of media content profiles.

12. The host device of claim 8, further comprising an output interface, wherein the host device transmits the super profile to each participant device via the output interface.

13. The host device of claim 8, further comprising an output interface, wherein for an identified media file, the host device transmits a playback command over the output interface to cause a participant device having access to the identified media file to play the media file.

14. The host device of claim 8, wherein the controller is further configured to receive via the input interface, and from each participant device, a list of identifications of a plurality of media files that satisfy the comparison criteria, and to combine the lists into a master playlist.

15. A participant device for a media content sharing system comprising:
  a storage device containing a plurality of stored media files;
  an input interface for receiving a super profile containing media content profiles corresponding to a plurality of other participant devices, wherein a media content profile includes a representation of at least one corresponding media file in the corresponding participant device;
  a controller configured to compare the stored media files to the super profile based on comparison criteria to identify at least stored one media file that satisfies the comparison criteria; and
  an output interface, wherein the controller is further configured to transmit the identification of at least one identified media file to a host device.

16. The participant device of claim 15, wherein the super profile includes a plurality of seeds, each seed being a representation of a corresponding media file accessible by a corresponding participant device.

17. The participant device of claim 16, wherein the media files are music files, and each seed includes musical characteristics data and an acoustic identifier.

18. The participant device of claim 16, wherein the controller is configured to compare the stored media files to the seeds in the super profile, the comparison criteria being a designated similarity between a compared media file and at least one seed in the super profile, and the controller is further configured to generate a list of identifications of a plurality of media files that satisfy the comparison criteria and to transmit the list to the host device.

19. The participant device of claim 15, wherein the participant device receives a playback command via the input interface corresponding to an identified media file, and the controller is further configured to stream the media file via the output interface to an output system for playback.

20. The participant device of claim 15, wherein the participant device is a mobile telephone.

* * * * *